US010785034B2

(12) United States Patent
Abe

(10) Patent No.: US 10,785,034 B2
(45) Date of Patent: Sep. 22, 2020

(54) IMPLEMENTATION UNIT, IMPLEMENTATION UNIT VERIFICATION METHOD, AND COMPUTER-READABLE RECORDING MEDIUM

(71) Applicant: FUJITSU LIMITED, Kawasaki-shi, Kanagawa (JP)

(72) Inventor: Yasuhiko Abe, Niiza (JP)

(73) Assignee: FUJITSU LIMITED, Kawasaki (JP)

( * ) Notice: Subject to any disclaimer, the term of this patent is extended or adjusted under 35 U.S.C. 154(b) by 137 days.

(21) Appl. No.: 15/944,110

(22) Filed: Apr. 3, 2018

(65) Prior Publication Data
US 2018/0227126 A1    Aug. 9, 2018

Related U.S. Application Data

(63) Continuation of application No. PCT/JP2015/078368, filed on Oct. 6, 2015.

(51) Int. Cl.
H04L 29/06 (2006.01)
H04L 9/32 (2006.01)
(Continued)

(52) U.S. Cl.
CPC .......... H04L 9/3236 (2013.01); B60R 16/023 (2013.01); H04J 3/0658 (2013.01);
(Continued)

(58) Field of Classification Search
CPC ........ G06F 21/30; G06F 21/44; G06F 21/445; G06F 21/45; G06F 21/50; H04L 63/08;
(Continued)

(56) References Cited

U.S. PATENT DOCUMENTS 6,108,326 A * 8/2000 Bruwer .............. G07C 9/00182
370/342
2003/0156721 A1    8/2003 Widman
(Continued)

FOREIGN PATENT DOCUMENTS

JP    2002-30838 A    1/2002
JP    2002-300165 A   10/2002
(Continued)

OTHER PUBLICATIONS

International Search Report dated Jan. 12, 2016, issued in counterpart application No. PCT/JP2015/078368. (3 pages).
(Continued)

Primary Examiner — Edward Zee
(74) Attorney, Agent, or Firm — Westerman, Hattori, Daniels & Adrian, LLP

(57) ABSTRACT

A disclosed implementation unit includes: an implementation unit counter that is synchronized with a verification apparatus counter provided in a verification apparatus; and a processing part configured to transmit an encryption signal to the verification apparatus at two or more different timings while a counter value of the implementation unit counter is a certain value, the encryption signal representing an implementation unit ID encrypted based on the counter value of the implementation unit counter.

9 Claims, 13 Drawing Sheets

(51) Int. Cl.
*B60R 16/023* (2006.01)
*H04J 3/06* (2006.01)
*H04L 9/08* (2006.01)

(52) U.S. Cl.
CPC .............. *H04L 9/0819* (2013.01); *H04L 9/32* (2013.01); *H04L 63/08* (2013.01); *H04L 63/0876* (2013.01); *H04L 63/12* (2013.01); *H04L 63/14* (2013.01); *H04L 2209/84* (2013.01)

(58) Field of Classification Search
CPC . H04L 63/0869; H04L 63/0876; H04L 63/14; H04L 63/12
See application file for complete search history.

(56) References Cited

U.S. PATENT DOCUMENTS

| | | | |
|---|---|---|---|
| 2010/0155475 A1 | 6/2010 | Paek et al. | |
| 2011/0093639 A1* | 4/2011 | Richards | H04L 12/40032 710/310 |
| 2014/0310530 A1 | 10/2014 | Oguma et al. | |
| 2015/0089236 A1* | 3/2015 | Han | H04L 9/3242 713/181 |

FOREIGN PATENT DOCUMENTS

| | | |
|---|---|---|
| JP | 2004-40660 A | 2/2004 |
| JP | 2010-11400 A | 1/2010 |
| JP | 2013-98719 A | 5/2013 |
| WO | 2007/059558 A1 | 5/2007 |
| WO | 2013065689 A1 | 5/2013 |
| WO | 2013128317 A1 | 9/2013 |

OTHER PUBLICATIONS

Woo, S. et al., "A Practical Wireless Attack on the Connected Car and Security Protocol for In-Vehicle CAN", IEEE Transactions on Intelligent Transporation Systems, Apr. 1, 2015, vol. 16, No. 2, pp. 993-1006; cited in Extended (supplementary) European Search Report dated Jul. 27, 2018.

Extended (supplementary) European Search Report dated Jul. 27, 2018, issued in counterpart European Application No. 15905799.1. (6 pages).

\* cited by examiner

FIG.11

| Cnt = 0 | decrypted Dev-ID |
|---|---|
| | XXXXX1 |
| | : |
| | : |
| | : |
| | XXXX10 |

| Cnt = 1 | decrypted Dev-ID |
|---|---|
| | XXXXX1 |
| | : |
| | : |
| | : |
| | XXXX10 |

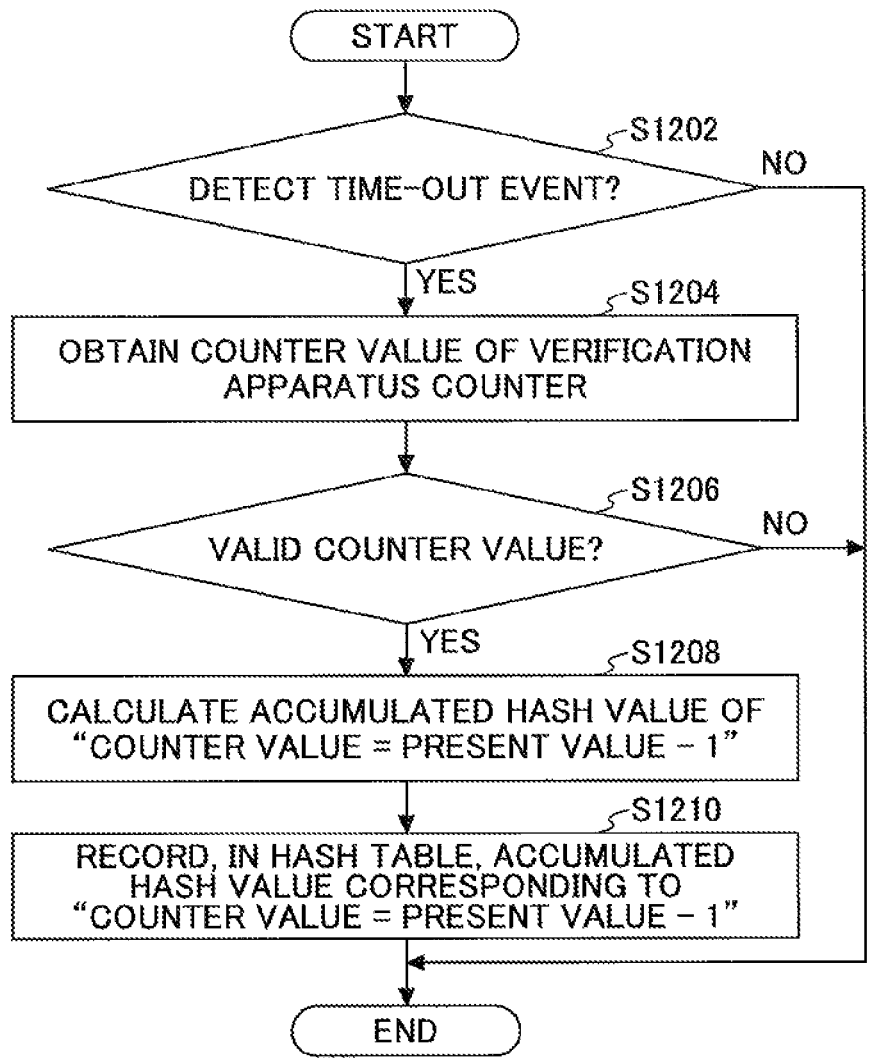

ial Application PCT/JP2015/078368 filed on Oct. 6, 2015 and designated the U.S., the entire contents of which are incorporated herein by reference.

IMPLEMENTATION UNIT, IMPLEMENTATION UNIT VERIFICATION METHOD, AND COMPUTER-READABLE RECORDING MEDIUM

CROSS-REFERENCE TO RELATED APPLICATION

This application is a continuation application of International Application PCT/JP2015/078368 filed on Oct. 6, 2015 and designated the U.S., the entire contents of which are incorporated herein by reference.

FIELD

The embodiment discussed herein relates to an implementation unit, an implementation unit verification method, and a computer-readable recording medium.

BACKGROUND

Conventionally, there is a known method for synchronizing counter values of respective counters between two nodes and for performing encryption and decryption by using the respective counter values in the nodes.

RELATED-ART DOCUMENTS

Patent Document

[Patent Document 1] Japanese Laid-open Patent Publication No. 2004-40660
[Patent Document 2] Japanese Laid-open Patent Publication No. 2013-98719

Here, it is useful for a system including a plurality of implementation units to have a verification mechanism capable of verifying soundness of the system, that is, a verification mechanism capable of verifying that each implementation unit is a valid unit (that is not an improperly attached unit or the like). This is because, for example, if a spoofing unit is provided in a system, the spoofing unit may adversely affect an operation of the system.

In this respect, a verification mechanism in which each of a plurality of implementation units transmits a verification signal to a verification apparatus and the soundness of the system is determined based on the verification signals received by the verification apparatus has the following problem. That is, in such a verification mechanism, there may be a case in which a certain implementation unit cannot transmit a verification signal to the verification apparatus at a normal timing due to transmission of other high-priority signals. In such a case, it is difficult to accurately determine the soundness of the system.

SUMMARY

According to one aspect of the present disclosure, an implementation unit for forming, in a system in which a plurality of nodes are connected via a network, at least one of the plurality of nodes is provided. The implementation unit includes: an implementation unit counter that is synchronized with a verification apparatus counter provided in a verification apparatus on the network; and a processing part configured to transmit an encryption signal to the verification apparatus at two or more different timings while a counter value of the implementation unit counter is a certain value, the encryption signal representing an implementation unit ID encrypted based on the counter value of the implementation unit counter.

The object and advantages of the invention will be realized and attained by means of the elements and combinations particularly pointed out in the claims. It is to be understood that both the foregoing general description and the following detailed description are exemplary and explanatory and are not restrictive of the invention.

BRIEF DESCRIPTION OF DRAWINGS

FIG. 11 is a diagram illustrating an example of device ID tables;
FIG. 12 is a flowchart illustrating an example of a hash table generation process that is executed by the verification apparatus;
FIG. 13 is a diagram illustrating an example of a hash table.

DESCRIPTION OF EMBODIMENT

In the following, embodiments will be described in detail with reference to the attached drawings. The present disclosure has an object to accurately verify, in a system including an implementation unit, soundness of the system.

Figure 1:
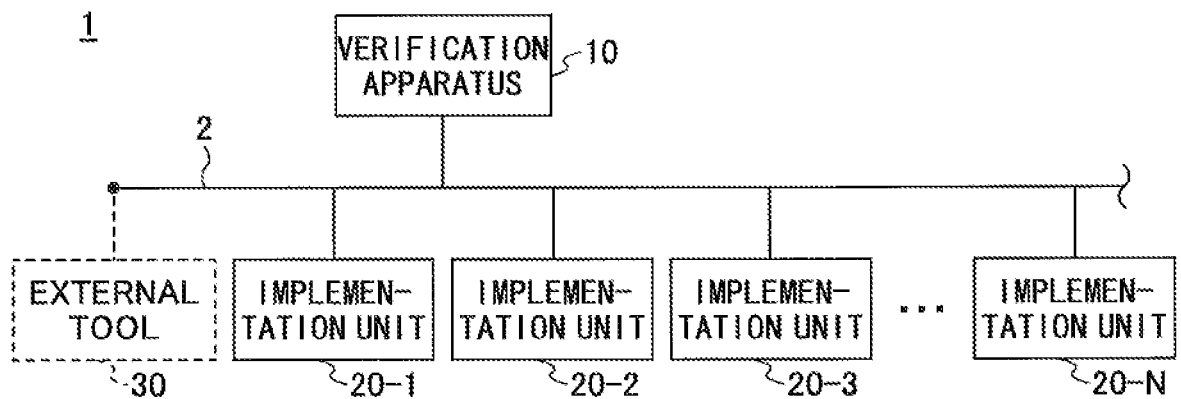
FIG. 1 is a diagram schematically illustrating an example of a vehicle system.

FIG. 1 is a diagram schematically illustrating an example of a vehicle system.

The vehicle system 1 is implemented on a vehicle. The vehicle system 1 includes a verification apparatus 10 and a plurality of implementation units 20-1 to 20-N. The verification apparatus 10 and the plurality of implementation units 20-1 to 20-N are communicably connected via a vehicle network 2 connected through wired and/or wireless lines. The vehicle network 2 conforms to a communication protocol such as a CAN (Controller Area Network) or a LIN (Local Interconnect Network), for example. In the following, as an example, the vehicle network 2 is assumed to conform to a CAN.

The verification apparatus 10 is formed by, for example, an ECU (Electronic Control Unit). The verification apparatus 10 may be formed by an ECU dedicated to verification or may be realized by an ECU having other functions.

Each of the plurality of implementation units 20-1 to 20-N is formed, for example, by an ECU. For example, the implementation units 20-1 to 20-N include ECUs such as an ECU that controls a driving apparatus such as an engine, an ECU that controls a braking apparatus, and an ECU that controls various components such as a door lock. Note that the plurality of implementation units 20-1 to 20-N may include a sensor having a built-in computer, an actuator having a built-in computer, a battery having a built-in computer, and the like. A unique implementation unit ID is given to each of the plurality of implementation units 20-1 to 20-N.

With regard to a verification method that will be described in the following, the plurality of implementation units 20-1 to 20-N have the same configuration except for the implementation unit IDs. Therefore, in the following, unless otherwise mentioned, any one representative implementation unit of the plurality of implementation units 20-1 to 20-N will be described. In the following, any one representative implementation unit of the plurality of implementation units 20-1 to 20-N will be referred to as the "implementation unit 20".

Note that an external tool 30 can be connected to the vehicle network 2 as schematically illustrated by the dotted line in FIG. 1. The external tool 30 is a tool that is used in a reliable place such as a dealer or a maker of a vehicle, for example. The external tool 30 can be used at the time of initializing the vehicle system 1 or at the time of extracting, to the outside, data inside the vehicle system 1.

Figure 2:
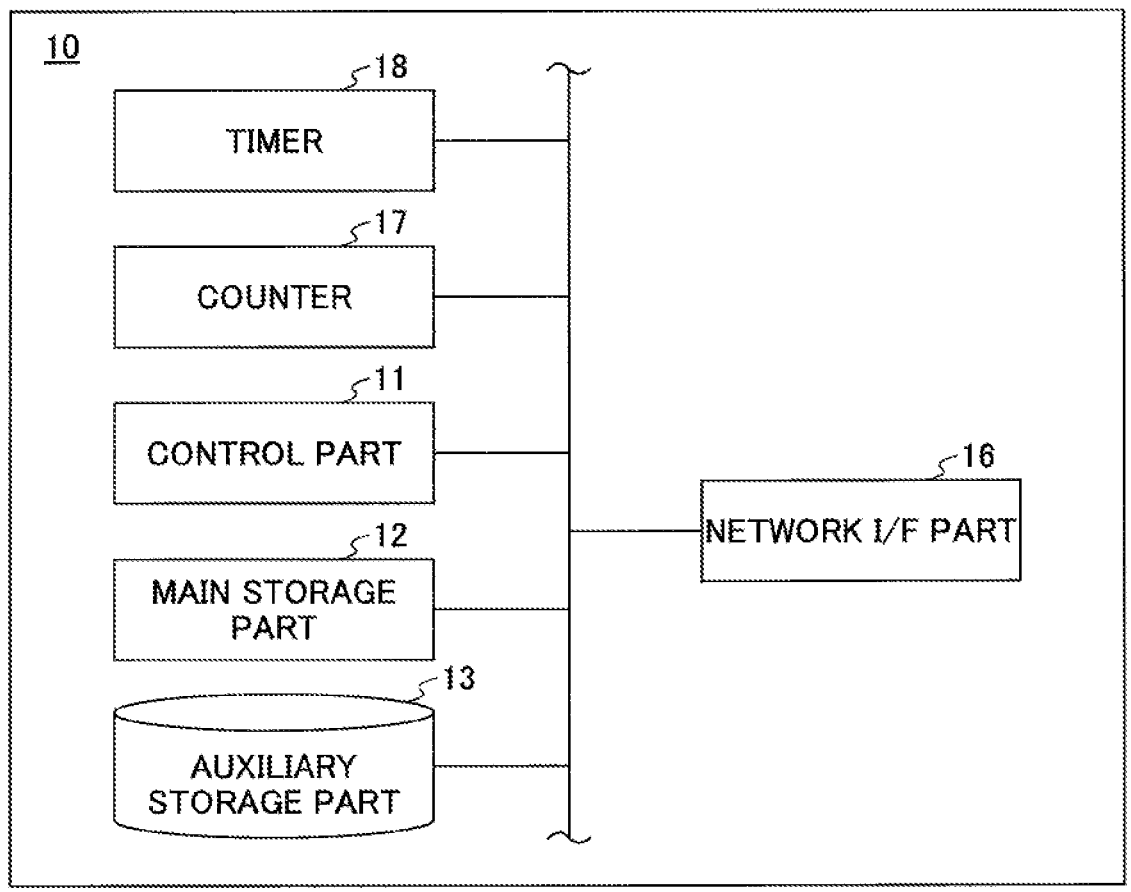
FIG. 2 is a diagram illustrating an example of a hardware configuration of a verification apparatus.

FIG. 2 is a diagram illustrating an example of a hardware configuration of the verification apparatus 10.

In the example that is illustrated in FIG. 2, the verification apparatus 10 includes a control part 11, a main storage part 12, an auxiliary storage part 13, a network I/F part 16, a counter 17, and a timer 18. Note that a tamper resistant technology (a hiding process of an internal circuit) may be applied to a part related to the verification function of the verification apparatus 10.

The control part 11 is an arithmetic device that executes programs stored in the main storage part 12 and the auxiliary storage part 13.

The main storage part 12 is a ROM (Read Only Memory), a RAM (Random Access Memory), or the like. The main storage part 12 is a storage device that stores or temporarily stores programs and data such as OS (Operating System), which is basic software that is executed by the control part 11, and application software.

The auxiliary storage part 13 is an EEPROM (Electrically Erasable Programmable Read-Only Memory), an HDD (Hard Disk Drive), or the like, and is a storage device that stores data related to application software and the like. In addition to a program prepared in advance, a program or the like downloaded from an external server after shipment of the vehicle may be stored (updated) in the auxiliary storage part 13.

The network I/F part 16 is an interface with the plurality of implementation units 20 connected via the vehicle network 2.

The counter 17 is realized by a counter as dedicated hardware (for example, a counter built in a CPU: Central Processing Unit). Note that the counter 17 may be realized by the control part 11 counting up (rewriting) a value (a counter value) in a specific storage area in a storage device (for example, the main storage part 12). Functions of the counter 17 and the timer 18 will be described later below. In the following, the counter 17 and the timer 18 are respectively referred to as the "verification apparatus counter 17" and the "verification apparatus timer 18" for distinction.

Figure 3:
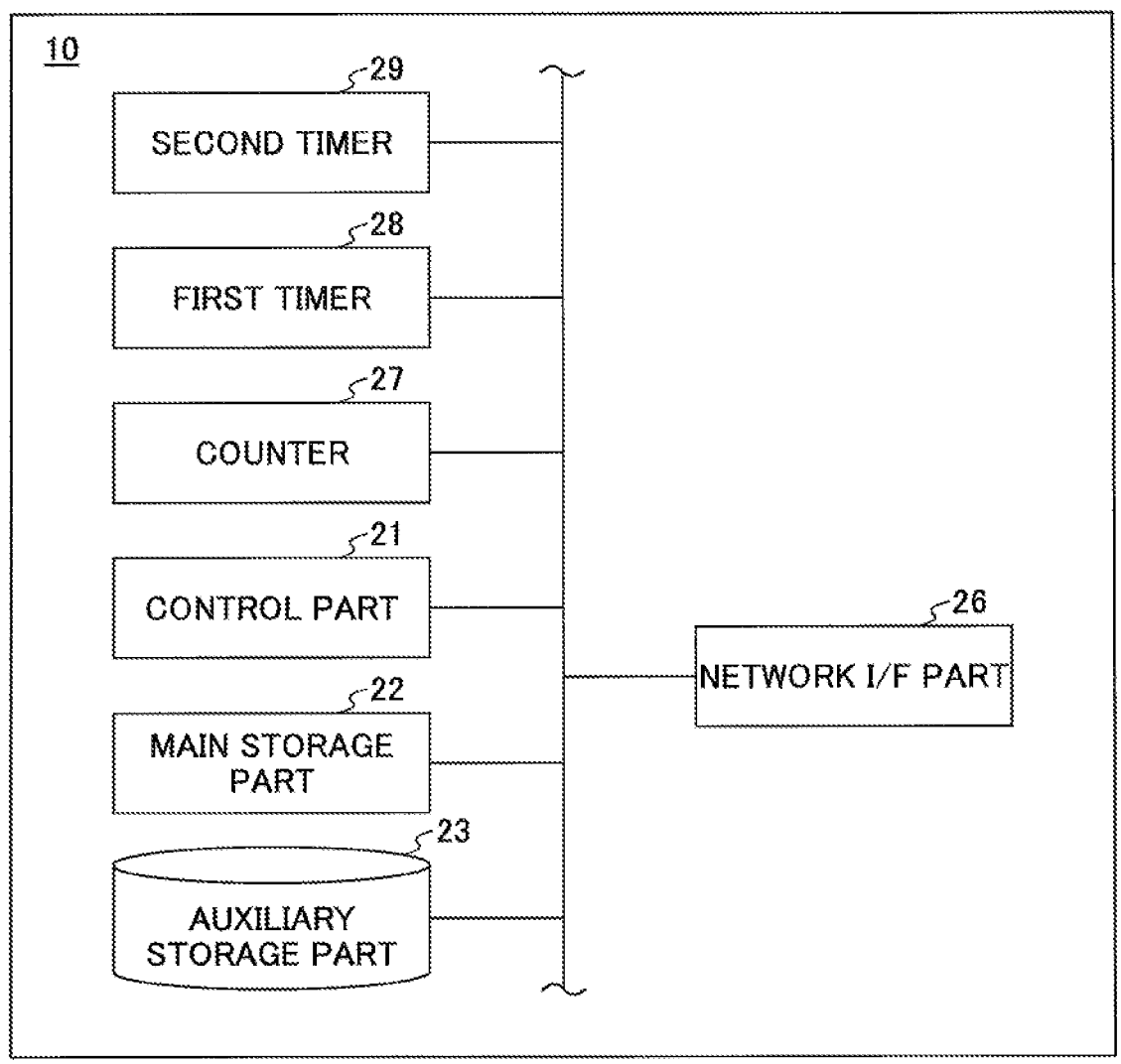
FIG. 3 is a diagram illustrating an example of a hardware configuration of an implementation unit.

FIG. 3 is a diagram illustrating an example of a hardware configuration of the implementation unit 20.

In the example that is illustrated in FIG. 3, the implementation unit 20 includes a control part 21, a main storage part 22, an auxiliary storage part 23, a network I/F part 26, a counter 27, a first timer 28, and a second timer 29. Similarly, a tamper resistant technology may be applied to a part related to the verification function of the implementation unit 20.

The control part 21 is an arithmetic device that executes programs stored in the main storage part 22 and the auxiliary storage part 23.

The control part 21, the main storage part 22, and the auxiliary storage part 23 are similar to the corresponding parts described in the hardware configuration of the verification apparatus 10.

The network I/F part 26 is an interface with the verification apparatus 10 connected via the vehicle network 2.

Similar to the counter 17, the counter 27 may be realized by a counter as dedicated hardware or may be realized by the control part 21 counting up (rewriting) a value (a counter value) in a specific storage area. Functions of the counter 27, the first timer 28, and the second timer 29 will be described later below. In the following, the counter 27, the first timer 28, and the second timer 29 are respectively referred to as the "implementation unit counter 27", the "first timer 28", and the "second timer 29" for distinction.

Figure 4:
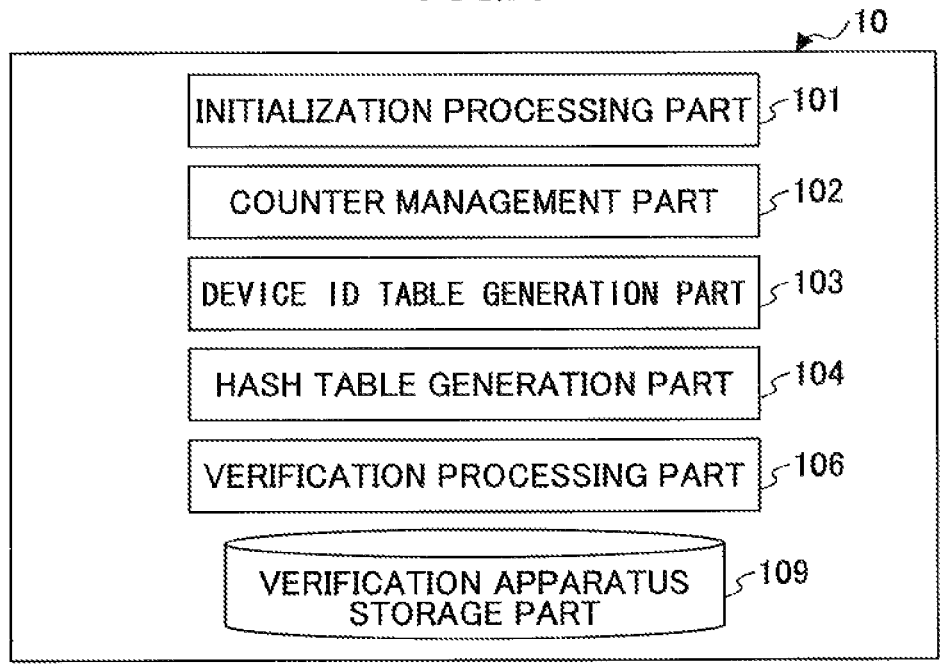
FIG. 4 is a diagram illustrating an example of functional parts of the verification apparatus.

FIG. 4 is a diagram illustrating an example of functional parts of the verification apparatus 10.

The verification apparatus 10 includes an initialization processing part 101, a counter management part 102, a device ID table generation part 103 (which is an example of a first processing part), a hash table generation part 104, a verification processing part 106, and a verification apparatus storage part 109. The hash table generation part 104 and the verification processing part 106 are an example of a second processing part.

Each of the initialization processing part 101, the counter management part 102, the device ID table generation part 103, the hash table generation part 104, and the verification processing part 106 is realized by the control part 11, which is illustrated in FIG. 2, executing one or more programs. Further, the verification apparatus storage part 109 is realized by the auxiliary storage part 13, which is illustrated in FIG. 2.

For example, before factory shipment of the vehicle, the initialization processing part 101 receives a system key together with a request to write the system key from the external tool 30, and stores the received system key in the verification apparatus storage part 109. Further, the initialization processing part 101 distributes, to the plurality of implementation units 20-1 to 20-N, the obtained system key together with the request to write the system key.

For example, when receiving a reset instruction from the external tool 30 before factory shipment of the vehicle, the counter management part 102 resets the verification apparatus counter 17 and the verification apparatus timer 18. Further, the counter management part 102 transmits a counter reset command to the plurality of implementation units 20-1 to 20-N via the vehicle network 2.

For example, when the ignition switch is turned on, the counter management part 102 resets the verification apparatus counter 17 and the verification apparatus timer 18 and transmits the counter reset command to the plurality of implementation units 20-1 to 20-N via the vehicle network 2.

After resetting the verification apparatus counter 17 and the verification apparatus timer 18, each time the verification apparatus timer 18 measures a predetermined time period T1, the counter management part 102 causes the verification apparatus counter 17 to perform a count up operation.

The device ID table generation part 103 generates a device ID table based on information received from the implementation units 20-1 to 20-N via the vehicle network 2. This operation example will be described later below. The device ID table generation part 103 stores the generated device ID table in the verification apparatus storage part 109.

The hash table generation part 104 generates a hash table based on the device ID table in the verification apparatus storage part 109. An operation example of the hash table generation part 104 will be described later below.

Based on the hash table in the verification apparatus storage part 109, the verification processing part 106 determines whether the implementation units 20-1 to 20-N are valid (are not inappropriate) implementation units. That is, the verification processing part 106 determines (verifies) soundness of the vehicle system 1. This operation example will be described later below.

The respective device IDs of the plurality of implementation units 20-1 to 20-N are stored in advance in the verification apparatus storage part 109. The respective device IDs of the plurality of implementation units 20-1 to 20-N are used in a verification process by the verification processing part 106 that will be described later below. Instead of the respective device IDs of the plurality of valid implementation units 20-1 to 20-N, another unique information (which is, for example, an accumulated hash value that will be described later below) that can be generated based on the IDs may be stored in the verification apparatus storage part 109.

Figure 5:
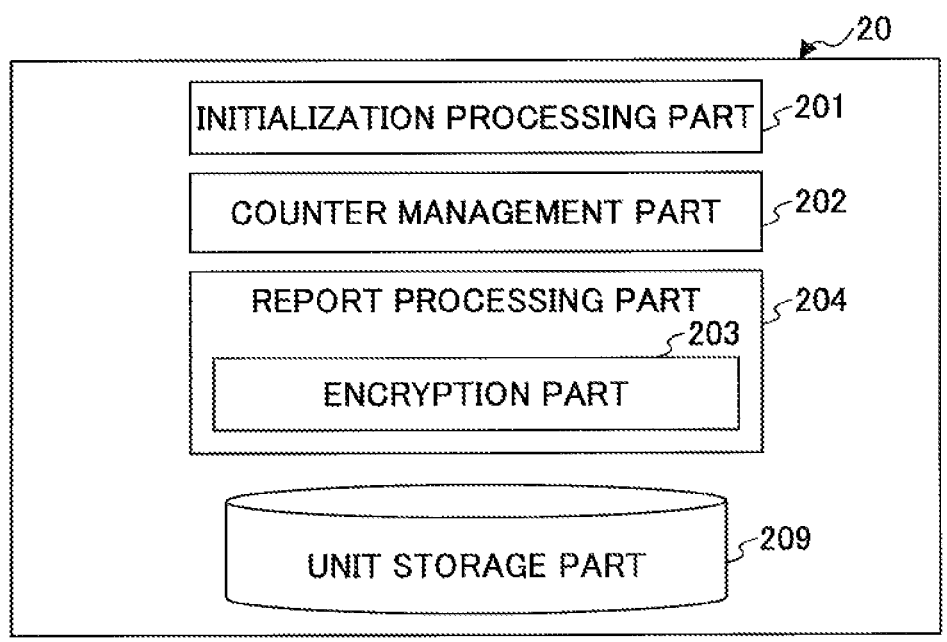
FIG. 5 is a diagram illustrating an example of functional parts of the implementation unit.

FIG. 5 is a diagram illustrating an example of functional parts of the implementation unit 20.

The implementation unit 20 includes an initialization processing part 201, a counter management part 202, a report processing part 204 (which is an example of a processing part), and a unit storage part 209. The report processing part 204 includes an encryption part 203.

Each of the initialization processing part 201, the counter management part 202, and the report processing part 204 is realized by the control part 21, which is illustrated in FIG. 3, executing one or more programs. Further, the unit storage part 209 is realized by the auxiliary storage part 23, which is illustrated in FIG. 3.

In response to the request to write the system key received via the vehicle network 2, the initialization processing part 201 stores the system key in the unit storage part 209.

In response to the counter reset command received via the vehicle network 2, the counter management part 202 resets the implementation unit counter 27, the first timer 28, and the second timer 29.

After resetting the implementation unit counter and the first timer 28, each time the first timer 28 measures the predetermined time period T1, the counter management part 202 causes the implementation unit counter 27 to perform a count up operation.

The report processing part 204 transmits, to the verification apparatus 10 via the vehicle network 2, an encryption ID signal generated by the encryption part 203 (which will be described later below). While the counter value of the implementation unit counter 27 is at each value, the report processing part 204 outputs, to the encryption part 203, an encryption request at two or more different timings. Therefore, while the counter value of the implementation unit counter 27 is at each value, the report processing part 204 transmits, at two or more different timings, the encryption signal generated by the encryption part 203 to the verification apparatus 10 via the vehicle network 2.

When receiving the encryption request from the report processing part 204, the encryption part 203 encrypts the implementation unit ID based on a counter value of the implementation unit counter 27 at that time and on the system key stored in the unit storage part 209. The implementation unit ID is an ID unique to the implementation unit 20, and is stored in advance in the unit storage part 209. The encryption part 203 generates a signal representing the encrypted implementation unit ID (which may also be referred to as an "encryption ID signal" in the following).

In the unit storage part 209, the implementation unit ID related to the corresponding implementation unit 20 is stored in advance.

Next, an operation example at the time of actual operation of the vehicle system 1 will be described.

Figure 6:
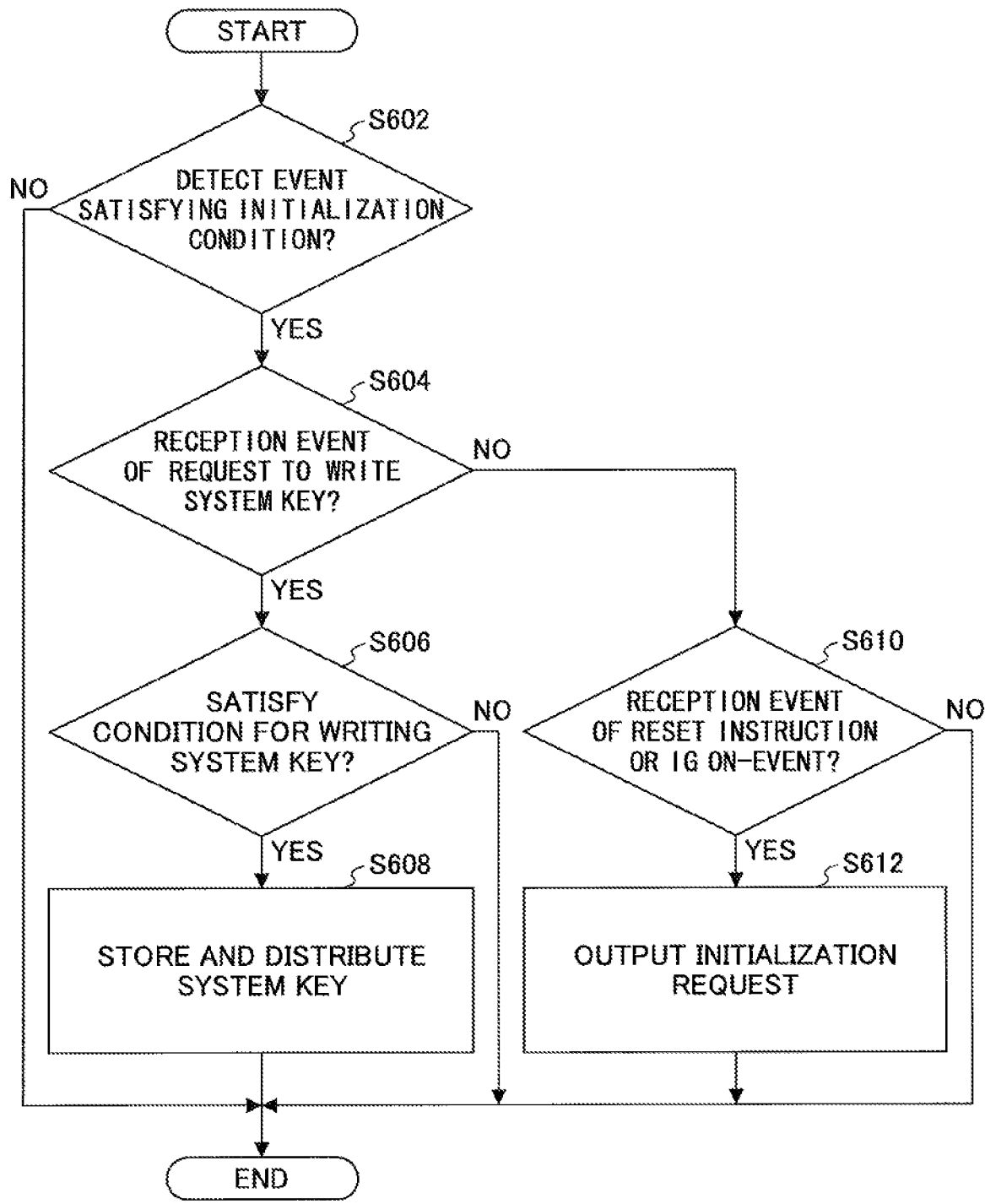
FIG. 6 is a flowchart illustrating an example of an initialization process that is executed by the verification apparatus.

FIG. 6 is a flowchart illustrating an example of an initialization process that is executed by the verification apparatus 10.

In step S602, the initialization processing part 101 determines whether an event satisfying an initialization condition has been detected. The event satisfying the initialization condition is as desired. In the following, examples of the event satisfying the initialization condition include a reception event of a request to write the system key from the external tool 30, a reception event of a reset instruction from the external tool 30, and an on-event where the ignition switch is turned on. When the determination result is "YES", the process proceeds to step S604, and when the determination result is "NO", the process ends as it is.

In step S604, the initialization processing part 101 determines whether the event satisfying the initialization condition is the reception event of the request to write the system key from the external tool 30. When the determination result is "YES", the process proceeds to step S606, and when the determination result is "NO", the process proceeds to step S610.

In step S606, the initialization processing part 101 determines whether a condition for writing the system key is satisfied. The condition for writing the system key is satisfied, for example, when the ignition switch is in the off state and an accessory switch is in the on state. When the determination result is "YES", the process proceeds to step S608, and when the determination result is "NO", the process ends as it is.

In step S608, the initialization processing part 101 stores, in the verification apparatus storage part 109, the system key received together with the request to write the system key from the external tool 30. Further, the initialization processing part 101 transmits, to the plurality of implementation units 20-1 to 20-N via the vehicle network 2, the received system key together with the request to write the system key.

In step S610, the initialization processing part 101 determines whether the event satisfying the initialization condition is the reception event of the reset instruction from the external tool 30 or the on-event of the ignition switch is turned on. When the determination result is "YES", the process proceeds to step S612, and when the determination result is "NO", the process ends as it is.

In step S612, the initialization processing part 101 outputs an initialization request to the counter management part 102. In response to this initialization request, the counter management part 102 resets the verification apparatus counter 17 and the verification apparatus timer 18. Further, in response to the initialization request, the counter management part 102 transmits a counter reset command to the plurality of implementation units 20-1 to 20-N via the vehicle network 2.

Figure 7:
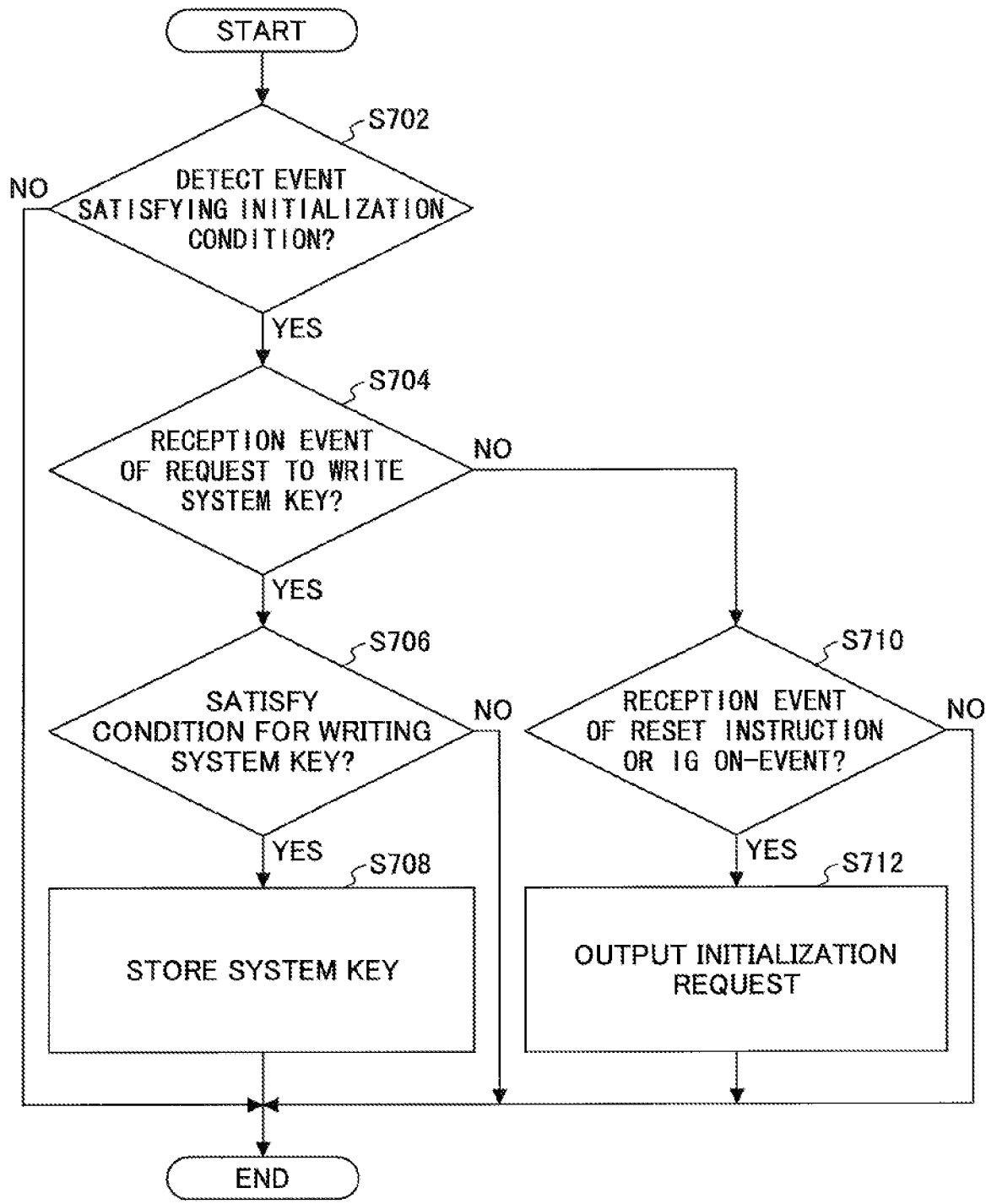
FIG. 7 is a flowchart illustrating an example of an initialization process that is executed by the implementation unit.

FIG. 7 is a flowchart illustrating an example of an initialization process that is executed by the implementation unit 20.

In step S702, the initialization processing part 201 determines whether an event satisfying an initialization condition has been detected. The event satisfying the initialization condition is as desired. In the following, examples of the event satisfying the initialization condition include a reception event of a request to write the system key from the verification apparatus 10 and a reception event of a counter reset command from the verification apparatus 10. When the determination result is "YES", the process proceeds to step S704, and when the determination result is "NO", the process ends as it is.

In step S704, the initialization processing part 201 determines whether the event satisfying the initialization condition is the reception event of the request to write the system key from the verification apparatus 10. When the determination result is "YES", the process proceeds to step S706, and when the determination result is "NO", the process proceeds to step S710.

In step S706, the initialization processing part 201 determines whether a condition for writing the system key is satisfied. The condition for writing the system key is satisfied similarly, for example, when the ignition switch is in the off state and an accessory switch is in the on state. When the determination result is "YES", the process proceeds to step S708, and when the determination result is "NO", the process ends as it is.

In step S708, the initialization processing part 201 stores, in the unit storage part 209, the system key received together with the request to write the system key from the verification apparatus 10.

In step S710, the initialization processing part 201 determines whether the event satisfying the initialization condition is the reception event of the counter reset command from the verification apparatus 10. When the determination result is "YES", the process proceeds to step S712, and when the determination result is "NO", the process ends as it is.

In step S712, the initialization processing part 201 outputs an initialization request to the counter management part 202. In response to this initialization request, the counter management part 202 resets the implementation unit counter 27, the first timer 28, and the second timer 29.

Figure 8:
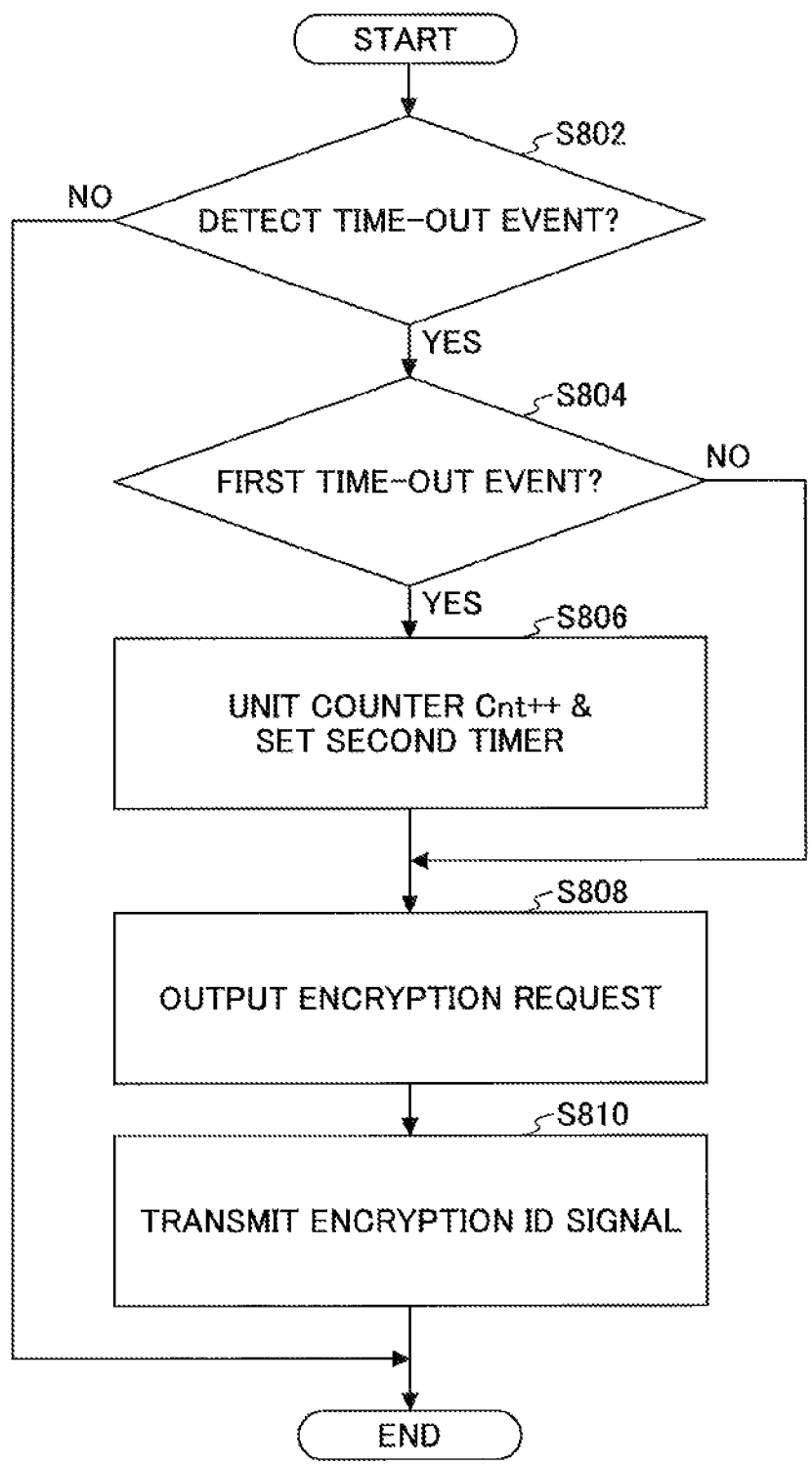
FIG. 8 is a flowchart illustrating an example of a reporting process that is executed by the implementation unit.

FIG. 8 is a flowchart illustrating an example of a reporting process that is executed by the implementation unit 20.

In step S802, the report processing part 204 determines whether a time-out event has been detected. The time-out event includes a first time-out event that occurs each time the first timer 28 counts a predetermined time period T1 and a second time-out event that occurs each time the second timer 29 counts a predetermined time period T2. Here, the length of the predetermined time period T1 is longer than that of the predetermined time period T2, and, for example, is twice or more of the length of the predetermined time period T2.

When the determination result is "YES", the process proceeds to step S804, and when the determination result is "NO", the process ends as it is.

In step S804, the report processing part 204 determines whether the time-out event is a first time-out event. When the determination result is "YES", the process proceeds to step S806, and when the determination result is "NO", the process proceeds to step S810.

In step S806, the report processing part 204 increments the counter value of the implementation unit counter 27 by "1". In addition, the report processing part 204 sets the second timer 29. Thereby, from this time point, the second timer 29 restarts counting from 0, and after the elapse of the predetermined time period T2, causes a second time-out event to occur.

In step S808, the report processing part 204 outputs an encryption request to the encryption part 203.

In step S810, the report processing part 204 transmits (reports), to the verification apparatus 10 via the vehicle network 2, an encryption ID signal generated by the encryption part 203 in response to the encryption request output in step S808.

According to the process that is illustrated in FIG. 8, each time the predetermined time period T1 elapses or each time the predetermined time period T2 elapses, the report processing part 204 outputs an encryption request to the encryption part 203 and transmits, to the verification apparatus 10, an encryption ID signal obtained in response to the encryption request. Here, the predetermined time period T2 is shorter than the predetermined time period T1 as described above. Therefore, while the counter value of the implementation unit counter 27 is at each value, the second timer 29 causes the second time-out event to occur at least once or more. That is, between the counter value of the implementation unit counter 27 changing to a certain value and changing to a next value, the second timer 29 causes the second time-out event to occur at least once or more. An occurrence timing of the second time-out event is different from an occurrence timing of the first time-out event. Therefore, while the counter value of the implementation unit counter 27 is at each value, the report processing part 204 can transmit, at two or more different timings (at each occurrence timing of the first time-out event and the second time-out event), the encryption ID signal to the verification apparatus 10.

Figure 9:
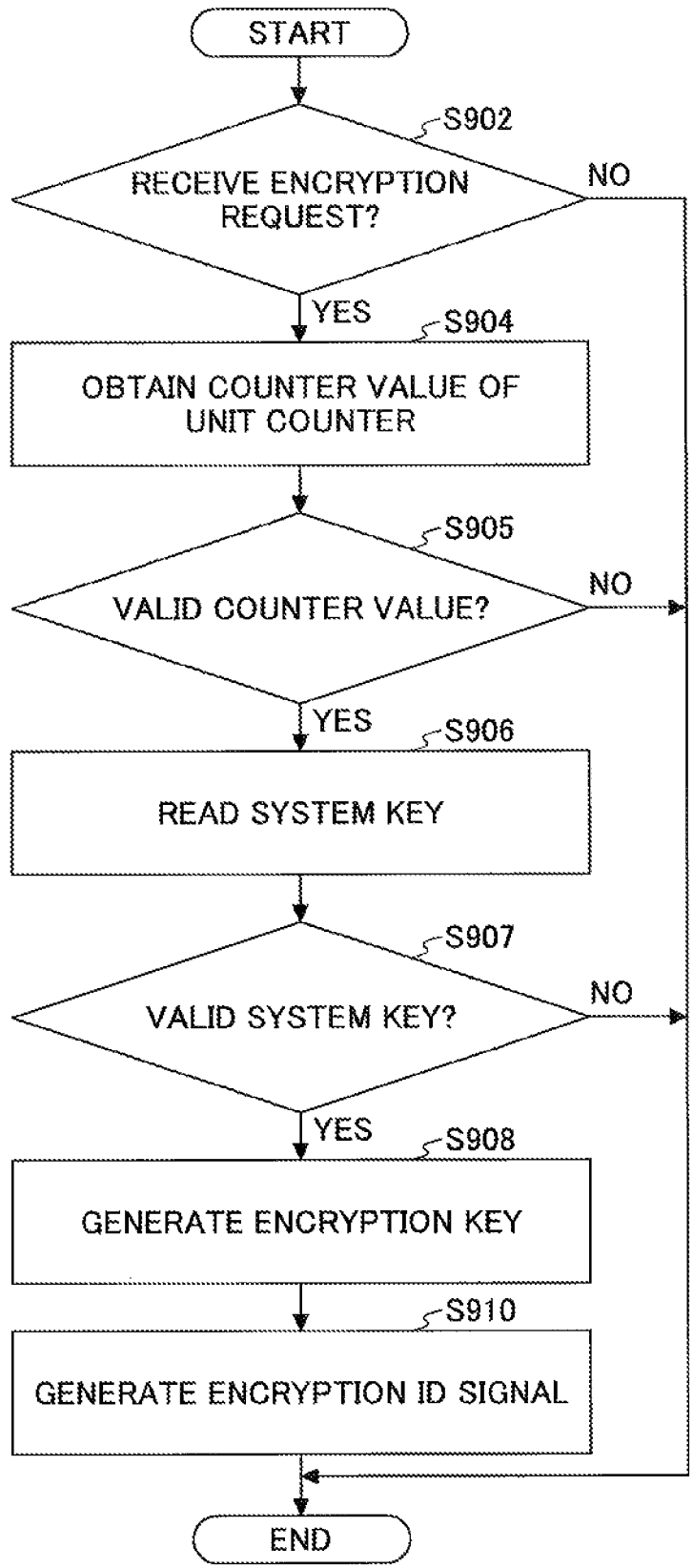
FIG. 9 is a flowchart illustrating an example of an encryption process that is executed by the implementation unit.

FIG. 9 is a flowchart illustrating an example of an encryption process that is executed by the implementation unit 20.

In step S902, the encryption part 203 determines whether an encryption request has been received from the report processing part 204. When the determination result is "YES", the process proceeds to step S904, and when the determination result is "NO", the process ends as it is.

In step S904, the encryption part 203 obtains a present counter value of the implementation unit counter 27.

In step S905, the encryption part 203 determines whether the obtained counter value has a valid value. When the above described initialization process is normally executed and the implementation unit counter 27 is normal, basically, the obtained counter value has a valid value. When the determination result is "YES", the process proceeds to step S906, and when the determination result is "NO", the process ends as it is.

In step S906, the encryption part 203 reads a system key from the unit storage part 209.

In step S907, the encryption part 203 determines whether the read system key has a valid value. When the above described initialization process is normally executed, basically, the obtained system key has a valid value. When the determination result is "YES", the process proceeds to step S908, and when the determination result is "NO", the process ends as it is.

In step S908, the encryption part 203 generates an encryption key based on the counter value obtained in step S904 and the system key obtained in step S906. Although the method of generating the encryption key is as desired, the following method is used as the method of generating the encryption key, for example.

$$\text{Enc-Key} = \text{Sys-Key EXOR Cntr}(d) \quad \text{Formula (1)}$$

Here, Enc-Key represents the encryption key, Sys-Key represents the system key, and Cntr(d) represents the present counter value of the implementation unit counter 27. According to the encryption by the equation (1), the encryption key is derived by obtaining the exclusive OR of the present counter value of the implementation unit 27 and the system key.

In step S910, the encryption part 203 encrypts, based on the encryption key generated in step 908, the implementation unit ID stored in the unit storage part 209 to generate an encryption ID signal.

That is, it is as follows.

$$\text{Rep} = \text{Enc}(\text{Enc-Key}, \text{Dev-ID}) \quad \text{Formula (2)}$$

Here, Rep is an encrypted implementation unit ID, and is included in the encryption ID signal. Dev-ID represents an implementation unit ID, and Enc (Enc-Key, Dev-ID) represents encryption of Dev-ID by encryption key Enc-Key. The encryption ID signal generated as described above is transmitted to the verification apparatus 10 in step S810 of the above described reporting process.

According to the process that is illustrated in FIG. 9, after resetting the implementation unit counter 27 and the like (see step S712), each time the predetermined time period T1 elapses or each time the predetermined time period T2 elapses, the encryption part 203 generates the encryption ID signal in response to the encryption request from the report processing part 204. The predetermined time period T2 is shorter than the predetermined time period T1 as described above. Therefore, while the counter value of the implementation unit counter 27 is at each value, the second timer 29 causes a second time-out event to occur at least once or more. As described above, the encryption ID signal is generated by encrypting the implementation unit ID based on the present counter value of the implementation unit counter 27. Therefore, when the implementation unit 20 is a valid implementation unit, the same encryption ID signal is generated with respect to two or more second time-out events while the counter value of the implementation unit counter 27 is a certain value. As a result, when the implementation unit 20 is a valid implementation unit, the report processing part 204 can transmit, at two or more different timings, the same encryption ID signal to the verification apparatus 10 while the counter value of the implementation unit counter 27 is at each value.

Figure 10:
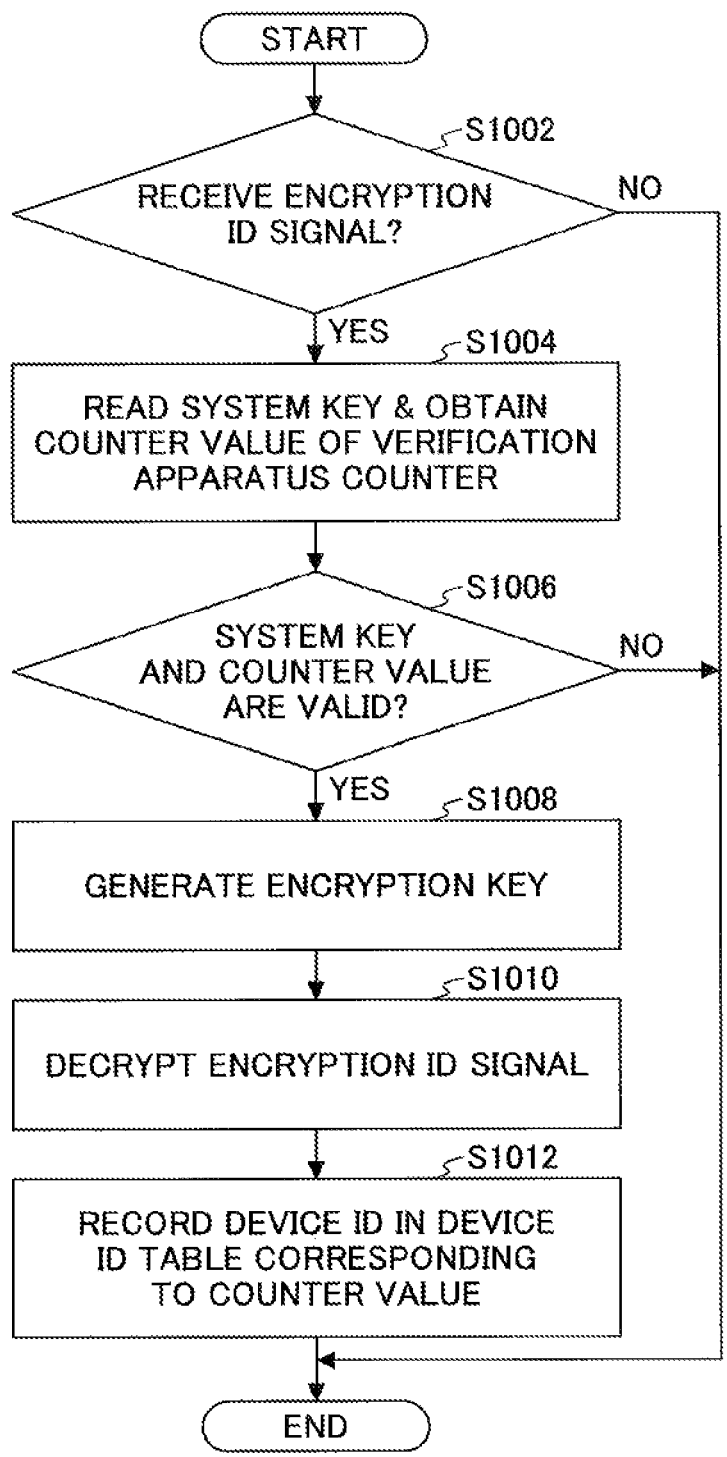
FIG. 10 is a flowchart illustrating an example of a generation process of a device ID table that is executed by the verification apparatus.

FIG. 10 is a flowchart illustrating an example of a generation process (recording process) of a device ID table that is executed by the verification apparatus 10.

In step S1002, the device ID table generation part 103 determines whether an encryption ID signal has been received via the vehicle network 2. When the determination result is "YES", the process proceeds to step S1004, and when the determination result is "NO", the process ends as it is.

In step S1004, the device ID table generation part 103 reads the system key from the verification apparatus storage part 109 and obtains the present counter value of the verification apparatus counter 17.

In step S1006, the device ID table generation part 103 determines whether the read system key has a valid value and the obtained counter value has a valid value. When the above described initialization process is normally executed, basically, the read system key has a valid value. When the above described initialization process is normally executed and the verification apparatus counter 17 is normal, basically, the obtained counter value has a valid value. When the determination result is "YES", the process proceeds to step S1008, and when the determination result is "NO", the process ends as it is.

In step S1008, the device ID table generation part 103 generates, based on the counter value obtained in step S1004 and the system key obtained in step S1004, an encryption key. The method of generating the encryption key is the same as that in the implementation unit 20 (see step S908). Specifically, the following method is used as the method of generating the encryption key, for example.

$$\text{Enc-Key} = \text{Sys-Key EXOR Cntr}(m) \quad \text{Formula (3)}$$

Here, Enc-Key represents the encryption key, Sys-Key represents the system key, and Cntr(m) represents the present counter value of the verification apparatus counter 17.

In step S1010, the device ID table generation part 103 decrypts, based on the encryption key generated in step S1008, the encryption ID signal received in step S1002. The decryption method depends on the encryption method performed in the implementation unit 20 (step S910). As an example, the following method is used.

$$\text{Dev-ID} = \text{decrypt}(\text{Rep}, \text{Enc-Key}) \quad \text{Formula (4)}$$

Here, decrypt(Rep, Enc-Key) represents decryption of Rep using the encryption key Enc-Key.

In the following, when a device ID extracted in this way is represented by a symbol in a Figure, it is represented as "decrypted Dev-ID" for distinction.

In step S1012, the device ID table generation part 103 records, in a device ID table corresponding to the counter value obtained in step S1004, the device ID obtained in step S1010. Here, for example, the device ID table generation part 103 generates (updates) the device ID table corresponding to the counter value obtained in step S1004 by recording the device ID obtained in step S1010 in the device ID table in ascending order. In a case where the device ID obtained in step S1010 has already been recorded in the device ID table corresponding to the counter value obtained in step S1004 (for example, in a case of second or subsequent reception from the same implementation unit 20), the device ID table generation part 103 does not update the device ID table.

As illustrated in FIG. 11, the device ID table is prepared for each counter value of the verification apparatus counter 17 and represents one or more device IDs decrypted for each counter value of the verification apparatus counter 17. For example, M device ID tables are set so as to correspond to M counter values of the verification apparatus counter 17, for example. In this case, each time the counter value of the verification apparatus counter 17 is updated, a device ID table related to the oldest counter value is released, and the device ID related to the new counter value is stored in the released device ID table. In the example that is illustrated in FIG. 11, the respective device ID tables are illustrated when the counter value of the verification apparatus counter 17=0 and when the counter value of the verification apparatus counter 17=1. The example that is illustrated in FIG. 11 indicates that device IDs of "XXXXX1" to "XXXX10" are decrypted when the counter value of the verification apparatus 17=0 and when the counter value of the verification apparatus 17=1. The number of device IDs of "XXXXX1" to "XXXX10" corresponds to the number of implementation units based on encryption ID signals normally received by the verification apparatus 10 via the vehicle network 2 when the counter value of the verification apparatus counter 17=0. In the example that is illustrated in FIG. 11, although the number of implementation units for which encryption ID signals are normally received by the verification apparatus 10 when the counter value of the verification apparatus counter 17 is 0 is the same as that when the counter value of the verification apparatus counter 17 is 1, these are not necessarily the same. Note that in a state where the soundness of the vehicle system 1 is secured, basically, the number of device IDs "XXXXX1" to "XXXX10" corresponds to the total number of the plurality of implementation units 20-1 to 20-N.

According to the process that is illustrated in FIG. 10, each time the verification apparatus 10 receives an encryption ID signal via the vehicle network 2, the verification apparatus 10 decrypts the encryption ID signal based on a system key and a counter value of the verification apparatus 17 at that time point (at decryption time point). The verification apparatus 10 generates a device ID table based on the device ID obtained as a result of the decryption. In this manner, each time the verification apparatus 10 receives the encryption ID signal via the vehicle network 2, the verification apparatus 10 generates (updates) the device ID table based on the device ID obtained from the encryption ID signal. Note that upon the counter value of the verification apparatus counter 17 changing, it becomes impossible to update the device ID table related to the immediately preceding counter value (the device ID table is fixed). In the following, the device ID table fixed in this way may be referred to as the "fixed device ID table".

FIG. 12 is a flowchart illustrating an example of a hash table generation process (accumulated hash value calculation process) that is executed by the verification apparatus 10.

In step S1202, the hash table generation part 104 determines whether a time-out event of the verification apparatus timer 18 has been detected. The verification apparatus timer 18 causes a time-out event to occur each time the verification apparatus timer 18 counts the predetermined time period T1.

In step S1204, the hash table generation part 104 obtains a present counter value of the verification apparatus counter 17. Note that the counter value of the verification apparatus counter 17 obtained at this time point is a counter value after being incremented by "1" by the counter management part 102 in accordance with the time-out event detected in step S1202.

In step S1206, the hash table generation part 104 determines whether the counter value obtained in step S1204 has a valid value. When the determination result is "YES", the process proceeds to step S1208, and when the determination result is "NO", the process ends as it is.

In step S1208, the hash table generation part 104 calculates an accumulated hash value based on the device ID table (the fixed device ID table) related to the counter value obtained by subtracting "1" from the counter value obtained in step S1204. That is, the hash table generation part 104 generates the accumulated hash value based on the device ID table fixed due to the time-out event detected in step S1202.

The accumulated hash value (Accumulated Hash (i)) at the time when the counter value of the verification apparatus counter 17 is "i" is calculated, for example, as follows. The hash table generation part 104 calculates hash values of all devices ID recorded in the device ID table corresponding to the counter value=i. Next, as illustrated in the formula (5), with respect to obtaining the respective calculated hash values, the hash table generation part 104 repeats exclusive ORs in ascending order of the device IDs to calculate the accumulated hash value (Accumulated Hash (i)).

$$\text{Hash Value}(0)=\text{Hash Value}(0)\text{EXOR Hash Value}(\text{Dev-ID } x) \quad \text{Formula (5)}$$

Here, the initial value of Hash Value(0) on the right side is a hash value of the first device ID in the device ID table corresponding to the counter value i of the verification apparatus counter 17, for example. In this case, in the example that is illustrated in FIG. 11, the initial value of the Hash Value(0) on the right side is the hash value of the device ID "XXXXX1". Hash Value (Dev-ID x) is a hash value of a respective device ID recorded at the x-th location (x=2, 3, . . . , j) in the device ID table corresponding to the counter value=i of the verification apparatus counter 17. Note that a hash function such as SHA (Secure Hash Algorithm)-256 can be used to calculate Hash Value(Dev-ID x). Here, j is the total number of device IDs recorded in the device ID table corresponding to the counter value=i of the verification apparatus counter 17. Hash Value(0) on the left side is a value obtained by obtaining the exclusive OR of Hash Value(0) on the right side and Hash Value(Dev-ID x). Hash Value(0) on the left side is used as Hash Value(0) on the right side in the next repetition calculation.

Specifically, first, the hash table generation part 104 performs calculation of the formula (5-1) with x=2.

$$\text{Hash Value}(0)=\text{Hash Value}(\text{Dev-ID 1})\text{EXOR Hash Value}(\text{Dev-ID 2}) \quad \text{Formula (5-1)}$$

Subsequently, the hash table generation part 104 performs calculation of the formula (5-2) with x=3 to update Hash Value(0).

$$\text{Hash Value}(0)=\text{Hash Value}(0)\text{EXOR Hash Value}(\text{Dev-ID 3}) \quad \text{Formula (5-2)}$$

Note that Hash Value(0) on the right side in the formula (5-2) corresponds to Hash Value(0) on the left side obtained by the formula (5-1).

Subsequently, the hash table generation part 104 performs calculation of the formula (5-3) with x=4 to update Hash Value(0).

$$\text{Hash Value}(0)=\text{Hash Value}(0)\text{EXOR Hash Value}(\text{Dev-ID 4}) \quad \text{Formula (5-3)}$$

Note that Hash Value(0) on the right side in the formula (5-3) corresponds to Hash Value(0) on the left side obtained by the formula (5-2).

The hash table generation part 104 increases x, such that x=5, 6, . . . , to repeat calculation of the formula (5) until x=j. Then, Hash Value(0) on the left side obtained when x=j is obtained as the accumulated hash value (Accumulated Hash (i)).

$$\text{Accumulated Hash}(i)=\text{Hash Value}(0)\text{EXOR Hash Value}(\text{Dev-ID } j) \quad \text{Formula (5-4)}$$

In step S1210, the hash table generation part 104 records, in the hash table, the accumulated hash value calculated in step S1208 in association with the counter value obtained by subtracting "1" from the counter value obtained in step S1204. That is, the hash table generation part 104 generates the hash table by recording an accumulated hash value in association with the counter value related to the device ID table used to obtain the accumulated hash value.

FIG. 13 illustrates an example of the hash table. FIG. 13 illustrates accumulated hash values (Accumulated Hash(0) to Accumulated Hash(N)) corresponding to the respective counter values of 0 to N of the verification apparatus counter 17. According to the process that is illustrated in FIG. 12, the accumulated hash value (Accumulated Hash(0)) when the counter value of the verification apparatus counter 17 is 0 is calculated when the counter value of the verification apparatus counter 17 becomes 1 ("YES" in step S1202) as described above. Note that the accumulated hash value (Accumulated Hash(0)) when the counter value of the verification apparatus counter 17 is 0 may be calculated at any timing after the counter value of the verification apparatus counter 17 becomes 1.

According to the process that is illustrated FIG. 12, for each counter value of the verification apparatus counter 17, one hash value (accumulated hash value) is calculated based on one or more device IDs obtained at the time of the same counter value. Note that because the accumulated hash value is calculated based on hash values of one or more respective device IDs, the accumulated hash value becomes an index value that represents the soundness of the vehicle system 1. Although each set of one or more device IDs is also an index value that represents the soundness of the vehicle system 1, from the viewpoint of reducing the required storage area (data amount) and from the viewpoint of reducing the load of comparison process, the accumulated hash value is more advantageous.

Figure 14:
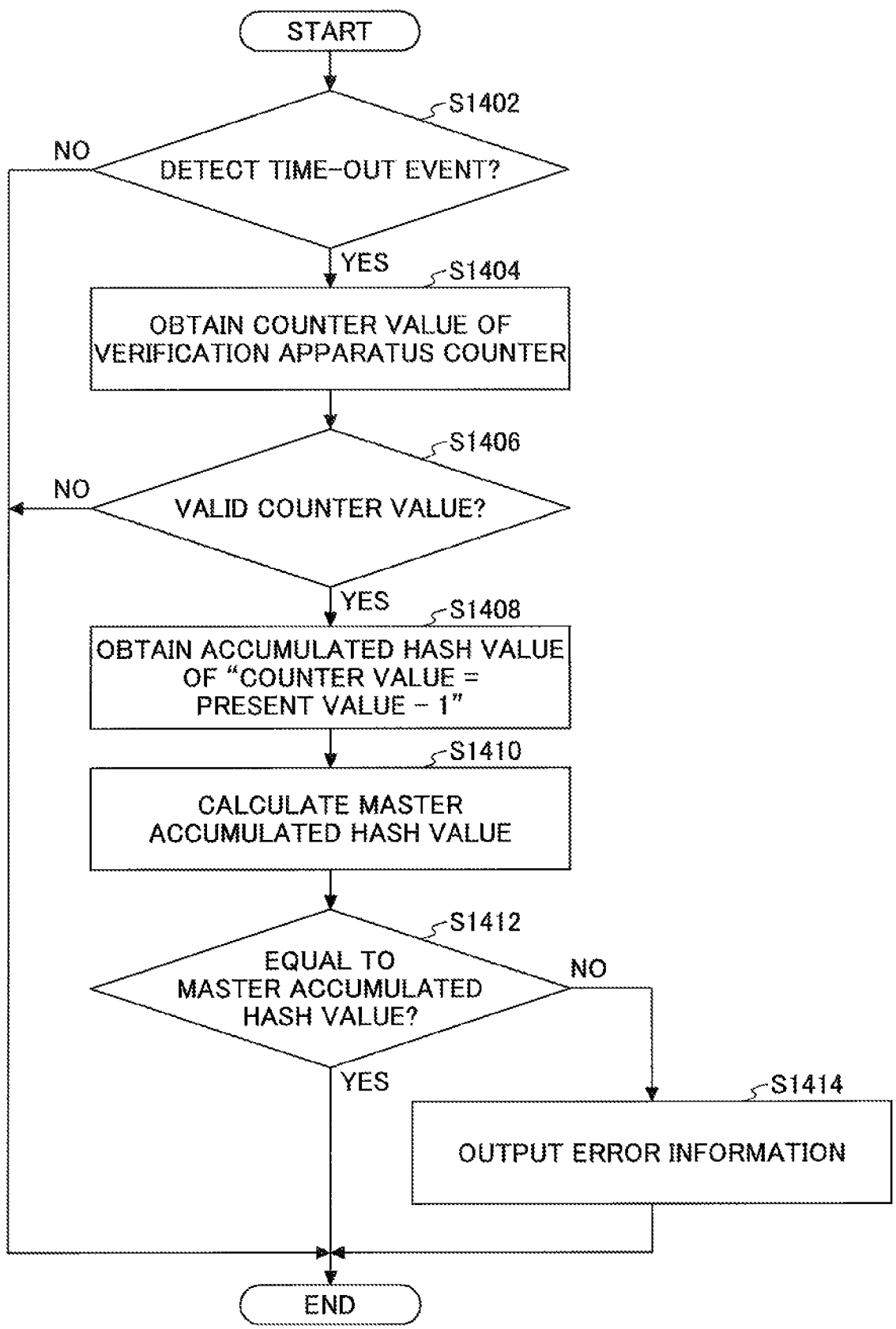
FIG. 14 is of a flowchart illustrating an example of a verification process that is executed by the verification apparatus.

FIG. 14 is a flowchart illustrating an example of a verification process that is executed by the verification apparatus 10.

In step S1402, the verification processing part 106 determines whether a time-out event of the verification apparatus timer 18 has been detected. The verification apparatus timer 18 causes a time-out event to occur each time the verification apparatus timer 18 counts the predetermined time period T1.

In step S1404, the verification processing part 106 obtains a present counter value of the verification apparatus counter 17. Note that the counter value of the verification apparatus counter 17 obtained at this time point is a counter value after being incremented by "1" by the counter management part 102 in accordance with the time-out event detected in step S1402.

In step S1406, the verification processing part 106 determines whether the counter value obtained in step S1404 has a valid value. When the determination result is "YES", the process proceeds to step S1408, and when the determination result is "NO", the process ends as it is.

In step S1408, the verification processing part 106 obtains, based on the hash table, an accumulated hash value related to the counter value obtained by subtracting "1" from the counter value obtained in step S1404. That is, the verification processing part 106 obtains the most recently calculated accumulated hash value. For example, when the counter value obtained by subtracting "1" from the counter value obtained in step S1404 is the verification processing part 106 obtains the accumulated hash value (accumulated Hash (i)) based on the hash table.

In step S1410, the verification processing part 106 calculates a valid accumulated hash value based on the respective device IDs of the plurality of valid implementation units 20-1 to 20-N stored in the verification apparatus storage part 109. In the following, the valid accumulated hash value, which is calculated based on the respective device IDs of the plurality of valid implementation units 20-1 to 20-N, is referred to as the "master accumulated hash value" for distinction. The calculation method of the master accumulated hash value itself is similar to the calculation method of the accumulated hash value (accumulated Hash) described above (see the description of step S1208 in FIG. 12). The calculation method of the master accumulated hash value only differs from the calculation method of the accumulated hash value described above in that the device IDs used for the calculation are the respective device IDs of the plurality of valid implementation units 20-1 to 20-N (device IDs stored in advance).

Note that the master accumulated hash value is a fixed value unless the combination of the plurality of valid implementation units 20-1 to 20-N is changed afterwards. Therefore, instead of or in addition to the respective device IDs of the plurality of valid implementation units 20-1 to 20-N, the master accumulated hash value may be stored in the verification apparatus storage part 109 in advance. In this case, in step S1410, the verification processing part 106 may extract the master accumulated hash value stored in the verification apparatus storage part 109. Alternatively, respective hash values of the respective device IDs of the plurality of valid implementation units 20-1 to 20-N may be stored in the verification apparatus storage part 109 in advance instead of or in addition to the device IDs. In this case, in step S1410, the verification processing part 106 calculates the master accumulated hash value based on the respective hash values stored in the verification apparatus storage part 109.

In step S1412, the verification processing part 106 determines whether the accumulated hash value obtained in step S1408 matches the master accumulated hash value obtained in step S1410. When the determination result is "YES", the process ends as it is, and when the determination result is "NO", the process proceeds to step S1414.

In step S1414, the verification processing part 106 outputs information representing that there is a possibility that the soundness of the vehicle system 1 is damaged (hereinafter, simply referred to as "error information"). The error information may be output in any manner. For example, the error information may be output to a display apparatus such as a meter, or may be output by voice via a sound output apparatus. Also, the error information may be stored in a predetermined storage device as diagnosis information.

According to the process that is illustrated in FIG. 14, the accumulated hash value recorded in the hash table is compared with the master accumulated hash value, and as a result of the comparison, when the accumulated hash value recorded in the hash table is different from the master accumulated hash value, error information is output. Thereby, when there is a possibility that the soundness of the vehicle system 1 is impaired, it is possible to output error information to that effect.

Note that in the process that is illustrated in FIG. 14, each time a time-out event of the verification apparatus timer 18 is detected, a new accumulated hash value is compared with the master accumulated hash value based on the hash table in which the new accumulated hash value is recorded. Thereby, the soundness of the vehicle system 1 is determined. However, such a verification process is not necessarily executed each time a time-out event of the verification apparatus timer 18 is detected. For example, for each instance of a multiple number of time-out events of the verification apparatus timer 18 being detected, such a verification process may be executed in one batch, based on the hash table in which multiple new accumulated hash values are recorded, with respect to the multiple accumulated hash values.

Figure 15:
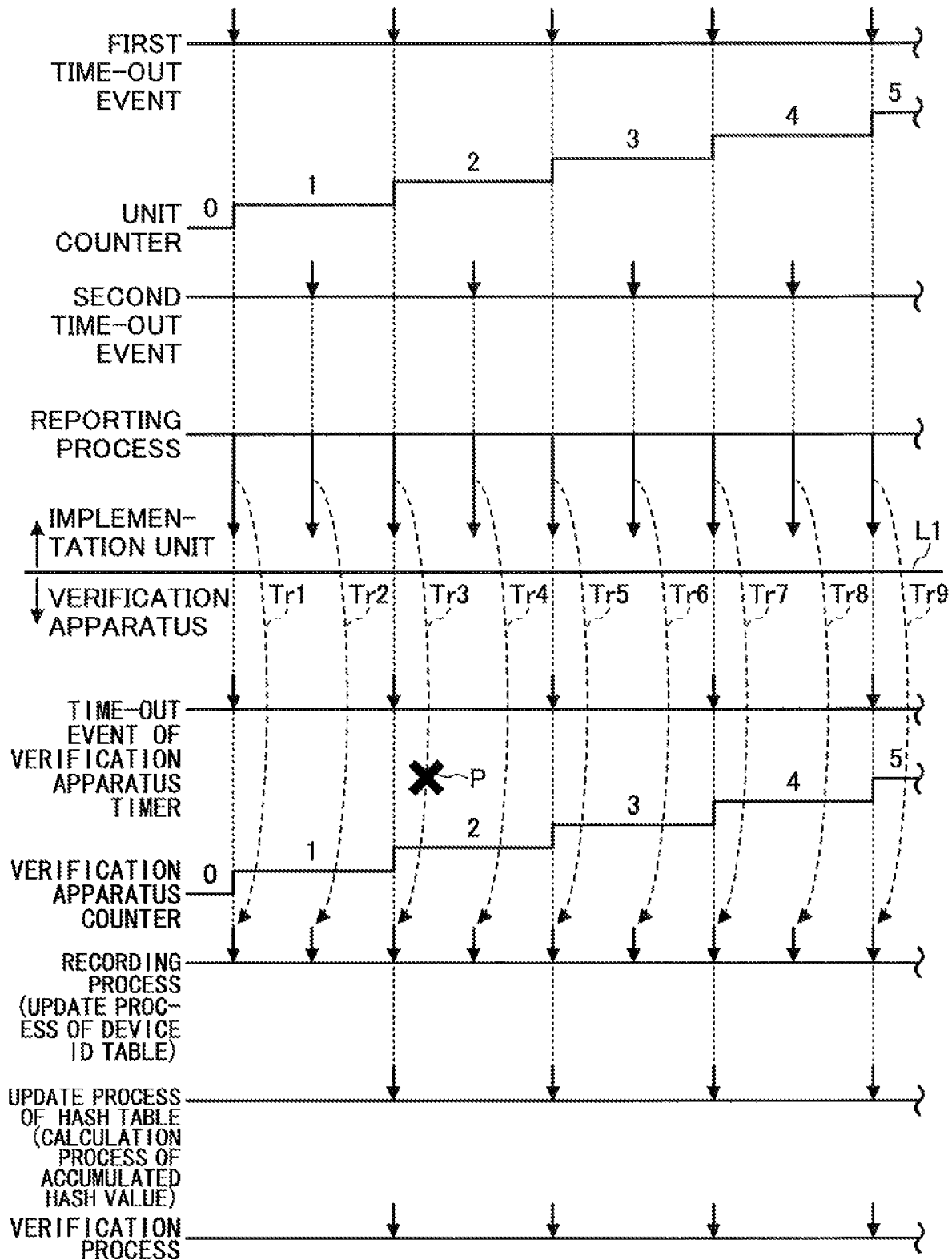
FIG. 15 is of timing charts of a part of the reporting process and the verification process.

FIG. 15 is of timing charts of a part of the reporting process and the verification process described above. In FIG. 15, the timing charts with respect to the implementation unit 20 are illustrated above the line L1, and the timing charts with respect to the verification apparatus 10 are illustrated below the line L1. In FIG. 15, the horizontal axis represents time, and the downward arrows given to the horizontal lines represent the timings on the time axis. Above the line L1, in order from the top, the respective timing charts related to the occurrence timing of the first time-out event, the counter value of the implementation unit counter 27, the occurrence timing of the second time-out event, and the execution timing of the reporting process are illustrated. Below the line L1, in order from the top, the respective timing charts related to the occurrence timing of the time-out event of the verification apparatus timer 18, the counter value of the verification apparatus counter 17, and the execution timing of the recording process (update timing of the device ID table) are illustrated. Further, below the timing chart related to the recording process, in order from top, the respective timing charts related to the update timing of the hash table (calculation timing of the accumulated hash value), and the execution timing of the verification process are illustrated. In FIG. 15, each of the dotted arrows Tr1 to Tr9 indicates the correspondence relationship between the reporting process and the corresponding recording process.

As illustrated in FIG. 15, the reporting process from the implementation unit 20 is executed at each occurrence timing of the first time-out event and the second time-out event. In response to this report processing, the above described device ID table generation process is executed by the verification apparatus 10. Further, each time the verification apparatus counter 17 performs a count up operation, the above described hash table generation process by the verification apparatus 10 is executed, and the verification process is executed.

Here, in the vehicle network 2, various signals or data (hereinafter simply referred to as "messages") from a large number of electronic devices (nodes) including the plurality of implementation units 20-1 to 20-N are circulated. Therefore, the vehicle network 2 has a system such that when messages are simultaneously transmitted from a plurality of nodes to the vehicle network 2, a high-priority message is transmitted without colliding with other messages. Generally, the high-priority message is a message related to vehicle traveling which may be a message related to braking power control or driving power control, for example. The message relating to braking power control or driving power control is regularly or irregularly transmitted from a control apparatus that performs braking power control or driving power control (one or more implementation units among the plurality of implementation units 20-1 to 20-N in FIG. 1) to the vehicle network 2.

Hence, to a message related to the reporting process from the implementation unit 20, more specifically, to an encryption ID signal sent from the report processing part 204 to the vehicle network 2, a relatively low priority tends to be given. As a result, there is a possibility that when the vehicle network 2 is congested by high-priority message(s), a message related to the reporting process from the implementation unit 20 is not transmitted to the vehicle network 2 at a desired timing and is not normally received by the verification apparatus 10. In the following, an event in which a message related to the reporting process from the implementation unit 20 is not normally received by the verification apparatus 10 due to high-priority message(s) may be referred to as a "communication error event".

In this respect, in a comparative configuration in which the reporting process from the implementation unit 20 is executed only at the occurrence timing of a first time-out event, the following problem occurs when a communication error event occurs. Here, a case is assumed in which the communication error event occurs at the occurrence timing of a first time-out event that sets the counter value of the implementation unit counter 27 to be "2". Note that this communication error event is schematically indicated by the x mark P with respect to the arrow Tr3 in FIG. 15. In a case in which such a communication error event occurs, when the counter value of the verification apparatus counter 17 is "2", the verification apparatus 10 cannot receive a message related to the report processing from the implementation unit 20. As a result, when the counter value of the verification apparatus counter 17 is "2", the device ID related to the implementation unit 20 is not recorded in the device ID table. Accordingly, the accumulated hash value calculated by the hash table generation part 104 based on the related device ID table (the accumulated hash value when the counter value of the verification apparatus counter 17=2) becomes a value calculated without including the device ID related to the implementation unit 20. This means that the accumulated hash value that is calculated by the hash table generation part 104 does not match the master accumulated hash value. Thus, the verification processing part 106 outputs information (error information) representing that there is a possibility that the soundness of the vehicle system 1 is damaged. In this way, in the comparative configuration, despite the fact that the soundness of the vehicle system 1 is not damaged, there is a possibility that error information is output due to a communication error event.

With respect to the above, according to the above described present embodiment, it is possible to reduce the above described problem that occurs in the comparative configuration. Specifically, similarly, a case is assumed in which a communication error event occurs at the occurrence timing of a first time-out event that sets the counter value of the implementation unit counter 27 to be "2". In the present embodiment, similar to the comparative configuration, the verification apparatus 10 cannot receive a message related to the reporting process from the implementation unit 20 at the occurrence timing of the first time-out event that sets the counter value of the implementation unit counter 27 to be "2". However, according to the present embodiment, the verification apparatus 10 can receive a message related to the reporting process from the implementation unit 20 at the occurrence timing of a second time-out event when the counter value of the implementation unit counter 27 is "2". That is, as indicated by the arrow Tr4 in FIG. 15, according to the present embodiment, the verification apparatus 10 can receive a message related to the reporting process from the implementation unit 20 when the counter value of the verification apparatus counter 17 is "2". As a result, when the counter value of the verification apparatus counter 17 is "2", the device ID related to the implementation unit 20 is recorded in the device ID table. Accordingly, the accumulated hash value, which is calculated by the hash table generation part 104 based on the related device ID table (the accumulated hash value when the counter value of the verification apparatus counter 17=2), becomes a value calculated including the device ID related to the implementation unit 20. This means that a problem of accumulated hash value calculated by the hash table generation part 104 not matching the master accumulated hash value due to one communication error event is avoided. Hence, according to the present embodiment, the possibility that error information is output based on the accumulated hash value at the time when the counter value of the verification apparatus counter 17=2 is reduced. In this way, according to the present embodiment, it is possible to reduce the possibility that error information is output due to a communication error event despite the fact that the soundness of the vehicle system 1 is not damaged.

Note that although the reporting process by the report processing part 204 is executed twice while the counter value of the implementation unit counter 27 is at each value in the example that is illustrated in FIG. 15, the reporting process is not limited to this. The reporting process by the report processing part 204 may be executed three or more times while the counter value of the implementation unit counter 27 is at each value. As the number of times of this reporting process by the report processing part 204 (the number of reporting process for each counter value) increases, robustness against a communication error event increases. Note that the number of reporting times for each counter value can be adjusted by adjusting the length of the predetermined time period T2 with respect to the predetermined time period T1. For example, in a case where the predetermined time period T2 is set to be shorter than ⅓ of the predetermined time period T1 but longer than ¼ of the predetermined time period T1, the number of times of the reporting process for each counter value of the implementation unit counter 27 is "4".

As described above, according to the present embodiment described above, for example, the following effect is obtained.

First, according to the present embodiment, in the implementation unit 20, an encryption key is generated based on a system key and a counter value of the implementation unit counter 27, and in the verification apparatus 10, an encryption key is generated based on a system key and a counter value of the verification apparatus counter 17. An encryption ID signal obtained by encrypting a device ID with the encryption key in the implementation unit 20 is transmitted to the verification apparatus 10 and decrypted by the encryption key in the verification apparatus 10. Therefore, when the encryption key in the implementation unit 20 is different from the encryption key in the verification apparatus 10, the device ID is not normally decrypted in the verification apparatus 10. That is, the device ID obtained by decrypting the encryption ID signal in the verification apparatus 10 is different from the device ID of the implementation unit 20. In this case, the accumulated hash value that is calculated in the verification apparatus 10 does not match the master accumulated hash value, and error information (information representing that the soundness of the vehicle system 1 may be impaired) is output.

In the present embodiment, assuming that the device ID held by the implementation unit 20 is a valid device ID, a main reason for outputting error information is that the encryption key in the implementation unit 20 differs from the encryption key in the implementation unit 20. When at least one of the counter value and the system key in the implementation unit 20 is different from the counter value and the system key in the verification apparatus 10, the encryption key generated by the implementation unit 20 is different from the encryption key generated by the verification apparatus 10.

In this respect, according to the present embodiment, the implementation unit 20 includes the implementation unit counter 27 whose counter value is synchronized with the counter value of the verification apparatus counter 17. That is, according to the present embodiment, the counter value of the verification apparatus counter 17 and the counter value of the implementation unit counter 27 are synchronized. Therefore, in the present embodiment, if the system key held by the implementation unit 20 is a valid system key, basically, a situation does not occur where the encryption key generated by the implementation unit 20 is different from the encryption key generated by the verification apparatus 10.

Here, a case is assumed in which an invalid unit (a spoofing unit) impersonating an implementation unit 20 transmits an invalid encryption ID signal to the verification apparatus 10 using the device ID of the implementation unit 20. In a case where the verification apparatus 10 cannot detect such a spoofing unit, for example, the spoofing unit may transmit an invalid control signal to the vehicle network 2 to execute undesirable vehicle control, and then the soundness of the vehicle system 1 may be impaired. Note that examples of the undesirable vehicle control may include driving power control based on a tampered target driving power and the like.

In such a case, even if the spoofing unit can fraudulently acquire the system key and the device ID of the implementation unit 20, it is difficult to have a counter that is synchronized with the counter value in the verification apparatus 10 (the counter value of the verification apparatus counter 17). This is because the counter value in the verification apparatus 10 is not a fixed value but is counted up for each time-out event of the verification apparatus timer 18. That is, the spoofing unit has no way to synchronize its own counter value with the counter value in the verification apparatus 10.

Therefore, according to the present embodiment, it is possible to effectively prevent the soundness of the vehicle system 1 from being impaired due to an invalid unit (a spoofing unit) impersonating the implementation unit 20.

Note that there is a communication error event as described above as a factor for outputting error information despite the fact that the encryption key in the implementation unit 20 is the same as the encryption key in the implementation unit 20. In such a case, because a possibility that the soundness of the vehicle system 1 has not been impaired is high, it is desirable that error information is not output. In this respect, according to the present embodiment, while the counter value of the implementation unit counter 27 is at each value, the reporting process by the report processing part 204 is executed twice or more. Therefore, according to the present embodiment, as described with reference to FIG. 15, it is possible to reduce the possibility that error information is output due to a communication error event despite the soundness of the vehicle system 1 not being damaged.

Although the specific embodiment has been described above, various variations and modifications may be made without departing from the scope recited in the claims and without being limited to the specific embodiment. Further, all or a plurality of components of the above described embodiment may be combined.

Figure 16:
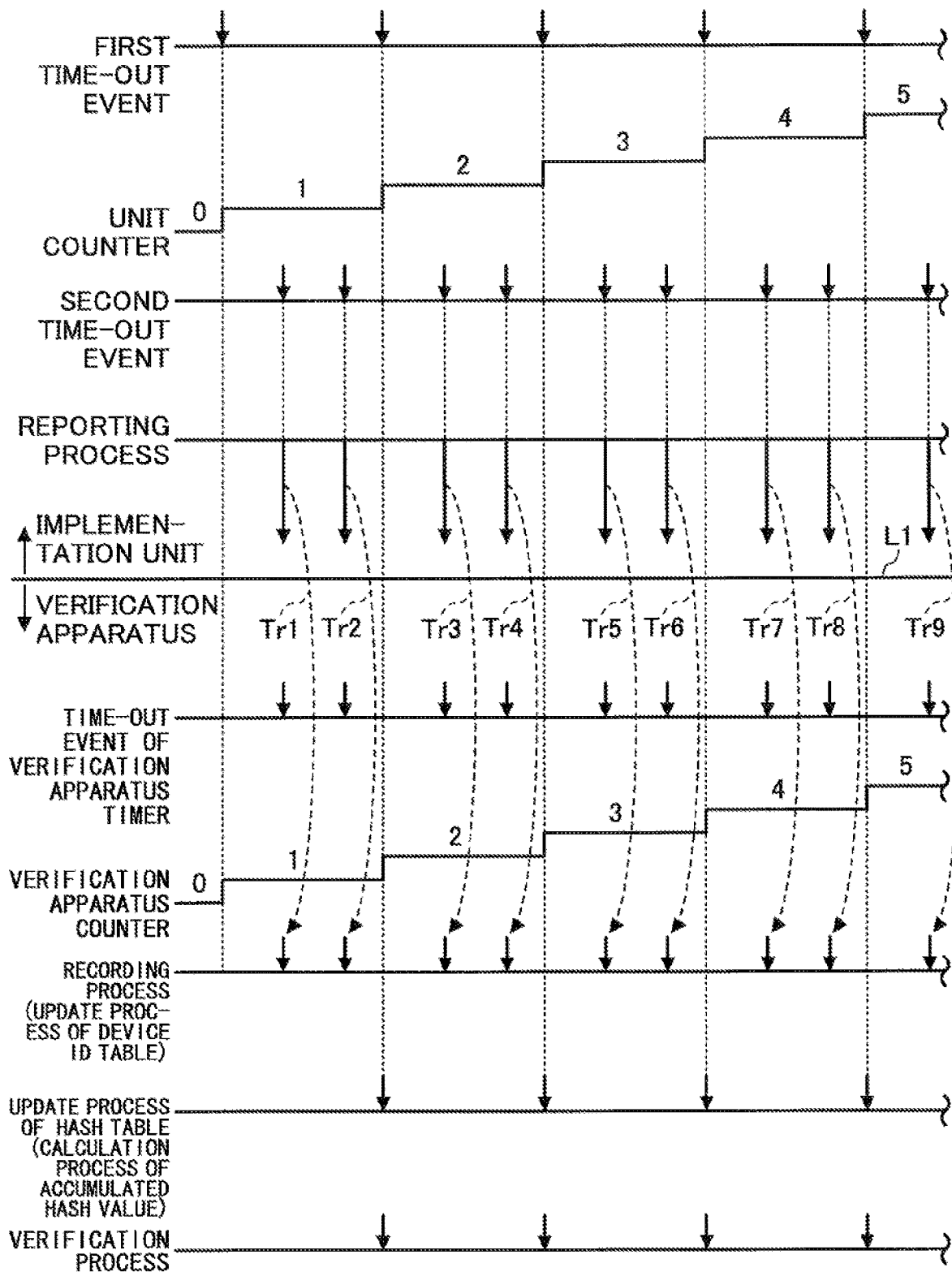
FIG. 16 is of timing charts illustrating a variation example.

For example, in the above described embodiment, the reporting process by the report processing part 204 is executed both when a first time-out event occurs and when a second time-out event occurs, but the reporting process is not limited to this. For example, in a case where the predetermined time period T2 is set to be less than ½ of the predetermined time period T1, the reporting process by the report processing part 204 may be executed only when a second time-out event occurs. That is, in a case where the predetermined time period T2 is set to be less than ½ of the predetermined time period T1, while the counter value of the implementation unit counter 27 is at each value, the second timer 29 can cause a second time-out event to occur at two or more different timings. This means that the reporting process by the report processing part 204 is necessarily executed twice or more during a period from the occurrence of a certain first time-out event to the occurrence of the next first time-out event. Thus, similar to the above described embodiment, it is possible to reduce the possibility that error information is output due to a communication error event. For example, FIG. 16 illustrates an example in which the predetermined time period T2 is set to be shorter than ½ of the predetermined time period T1 but longer than ⅓ of the predetermined time period T1. It is clear from FIG. 16 that the reporting process by the report processing part 204 can be necessarily executed twice or more during a period from the occurrence of a certain first time-out event to the occurrence of the next first time-out event.

In the above described embodiment, the second timer 29 is set for each first time-out event, but the second timer 29 is not limited to this. That is, the second timer 29 does not necessarily need to be set in synchronization with the first time-out event. For example, when the predetermined time period T2 is made shorter than the predetermined time period T1, the second time-out event always occurs between the occurrence of a certain first time-out event and the occurrence of the next first time-out event. This means that the reporting process by the report processing part 204 is executed at the occurrence time point of a certain first time-out event and at the occurrence time point of a second time-out event that necessarily occurs before the occurrence of the next first time-out event. Thereby, similar to the above described embodiment, it is possible to reduce the possibility that error information is output due to a communication error event.

Although error information is output in a case where at least one of the accumulated hash values for the respective counter values of the verification apparatus counter 17 differs from the master accumulated hash value in the process that is illustrated in FIG. 14, the process is not limited to this. For example, error information may be output in a case where a state, in which the accumulated hash value for each counter value of the verification apparatus counter 17 differs from the master accumulated hash value, continues even when the counter value of the verification apparatus counter 17 changes a predetermined number of times or more.

All examples and conditional language provided herein are intended for pedagogical purposes of aiding the reader in understanding the invention and the concepts contributed by the inventors to further the art, and are not to be construed as limitation to such specifically recited examples and conditions, nor does the organization of such examples in the specification relate to a showing of superiority and inferiority of the invention. Although one or more embodiments of the present invention have been described in detail, it should be understood that various changes, substitutions, and alterations could be made hereto without departing from the spirit and scope of the invention.

What is claimed is:

1. An implementation unit for forming, in a system in which a plurality of nodes are connected via a network, at least one of the plurality of nodes, the implementation unit comprising:
   an implementation unit counter that is synchronized with a verification apparatus counter provided in a verification apparatus on the network; and
   a hardware processor configured to transmit an encryption signal to the verification apparatus at two or more different timings while a counter value of the implementation unit counter is a same value, the encryption signal representing an implementation unit ID encrypted based on the counter value of the implementation unit counter, the counter value of the implementation counter being maintained at the same counter value during the two or more different timings,
   wherein the verification apparatus determines soundness of the system based on the encryption signal and based on a counter value of the verification apparatus counter at a time when the verification apparatus receives the encryption signal, and
   wherein the verification apparatus calculates one hash value based on all the different implementation unit IDs obtained while the counter value of the verification apparatus counter is at the same counter value and determines the soundness of the system based on the calculated hash value.

2. The implementation unit according to claim 1, further comprising:
   a first timer configured to time out for each first time period, to change the counter value of the implementation unit counter; and
   a second timer provided in the implementation unit and configured to time out for each second time period, the second time period being shorter than the first time period,
   wherein the timings include a time when the second timer times out.

3. The implementation unit according to claim 2, wherein the timings further include a time when the counter value of the implementation unit counter changes.

4. The implementation unit according to claim 2, wherein the second timer is set when the counter value of the implementation unit counter changes.

5. The implementation unit according to claim 1, wherein the encryption signal is generated based on the counter value and a common key given in advance.

6. The implementation unit according to claim 1, wherein the implementation unit is connected to the verification apparatus via a vehicle network conforming to a CAN (Controller Area Network).

7. A verification apparatus for verifying soundness of a system in which a plurality of implementation units are connected via a network, the verification apparatus comprising:
   a verification apparatus counter that is synchronized with an implementation unit counter provided in each of the plurality of implementation units;
   a first hardware processor configured to receive an encryption signal, representing an implementation unit ID encrypted by each of the plurality of implementation units based on the counter value of the implementation unit counter at a time of encryption and transmitted from each of the plurality of implementation units, at two or more different timings while a counter value of the implementation unit counter is a same value, the counter value of the implementation counter being maintained at the same counter value during the two or more different timings; and a second hardware processor configured to determine the soundness of the system based on the encryption signal and based on a counter value of the verification apparatus counter at a time when the first hardware processor receives the encryption signal, wherein the second hardware processor calculates one hash value based on all the different implementation unit IDs obtained while the counter value of the verification apparatus counter is at the same counter value and determines the soundness of the system based on the calculated hash value.

8. The verification apparatus according to claim 7, wherein the second hardware processor determines the soundness of the system based on a comparison result of the calculated hash value with one reference hash value that is based on all the implementation unit IDs that are valid and respectively related to the plurality of implementation units.

9. A non-transitory computer-readable recording medium having stored therein an implementation unit verification program for verifying soundness of a system in which a plurality of nodes are connected via a network, the implementation unit verification program for causing a computer of an implementation unit that forms at least one of the plurality of nodes to execute a process, the process comprising:

synchronizing an implementation unit counter with a verification apparatus counter provided in a verification apparatus on the network; and transmitting an encryption signal to the verification apparatus at two or more different timings while a counter value of the implementation unit counter is a same value, the encryption signal representing an implementation unit ID encrypted based on the counter value of the implementation unit counter, the counter value of the implementation counter being maintained at the same counter value during the two or more different timings, wherein the verification apparatus determines the soundness of the system based on the encryption signal and based on a counter value of the verification apparatus counter at a time when the verification apparatus receives the encryption signal, and wherein the verification apparatus calculates one hash value based on all the different implementation unit IDs obtained while the counter value of the verification apparatus counter is at the same counter value and determines the soundness of the system based on the calculated hash value.

* * * * *